United States Patent
Wallace et al.

[11] Patent Number: 5,938,246
[45] Date of Patent: Aug. 17, 1999

[54] INCREASED PRESSURE FLUID CARRYING PIPELINE SYSTEM AND METHOD THEREFOR

[76] Inventors: Thomas C. Wallace; David W. Wallace, both of 1265 S. High St., Denver, Colo. 80210

[21] Appl. No.: 08/798,362

[22] Filed: Feb. 10, 1997

[51] Int. Cl.$^6$ ................................................. A16L 17/06
[52] U.S. Cl. ........................ 285/351; 285/363; 285/906; 285/910; 277/314
[58] Field of Search .................................. 285/363, 368, 285/906, 910, 918, 351; 277/612, 314, 615

[56] References Cited

U.S. PATENT DOCUMENTS

| | | | |
|---|---|---|---|
| 1,161,430 | 11/1915 | Wiedeman | 285/363 X |
| 2,513,178 | 6/1950 | Jackson | 285/363 |
| 3,930,656 | 1/1976 | Jelinek | 285/363 X |
| 4,690,438 | 9/1987 | Kanczarek | 285/363 |
| 5,333,919 | 8/1994 | Nerenberg | 285/363 |
| 5,564,715 | 10/1996 | Wallace | 277/612 |
| 5,785,322 | 7/1998 | Suggs et al. | 277/615 |

*Primary Examiner*—Dave W. Arola
*Attorney, Agent, or Firm*—Timothy J. Martin; Michael R. Henson

[57] ABSTRACT

A method of maximizing system operating pressure capability of a selected flange joint in a fluid carrying pipeline system comprises minimizing bold load operating conditions and bolt load pre-load conditions at the selected flange joint by interposing a self-energizing seal assembly having negligible "m" and "y" values in surrounding relation to the joint's axial bore. The load producing moment resulting from connection of the flanges with the bolts is minimized by interposing a gasket element having a gasket thickness less than the seal thickness of the self-energizing seal assembly. The gasket element is interposed in a surrounding relation to the seal assembly at an outer radial location proximate to the outer flange surface margin. The flanges are connected with the bolts to form the flange joint while supporting the self-energizing seal assembly and the gasket element at the inner and outer radial locations, respectively, thereby to compress the self-energizing seal from the seal thickness to the gasket thickness. A method is also provided for forming a high pressure fluid carrying pipeline system adapted to convey a fluid at a system pressure of at least 1000 PSI. A high pressure fluid carrying pipeline system is also provided which broadly comprises a plurality of joined pipeline sections, a seal device including a self-energizing seal assembly interposed between flange pairs, a rigid gasket element in surrounding relation to each seal assembly, a plurality of nut and bolt sets interconnecting the flanges with the seal assembly compressed therebetween and a fluid disposed in the axial bore.

22 Claims, 2 Drawing Sheets

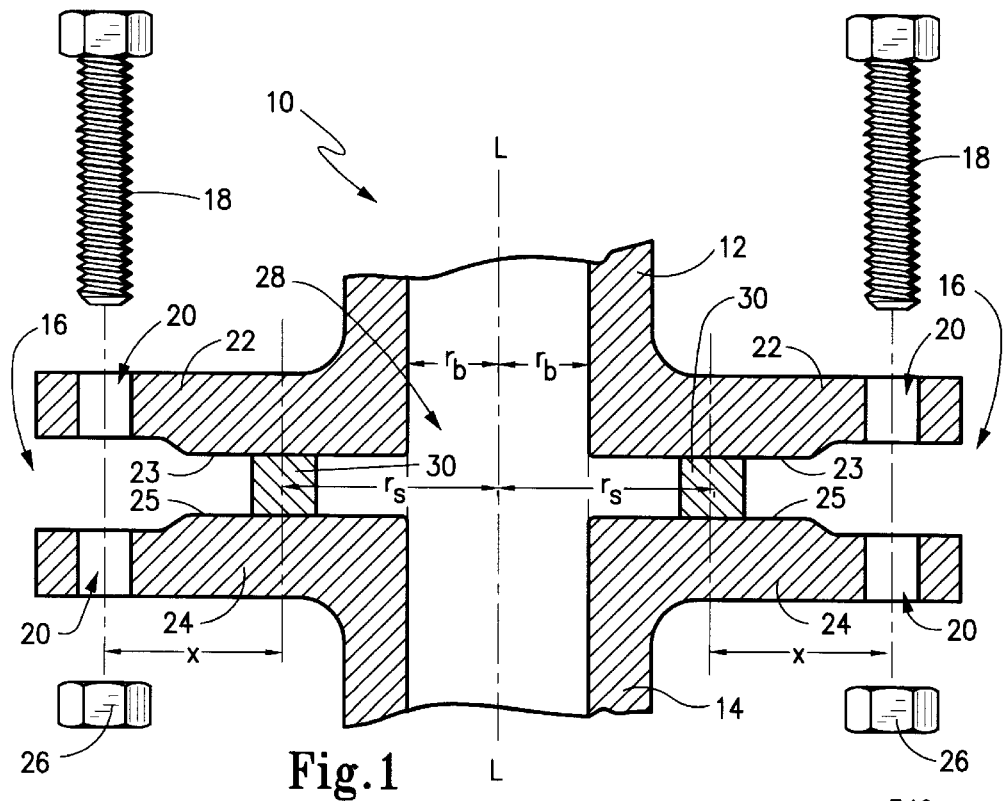
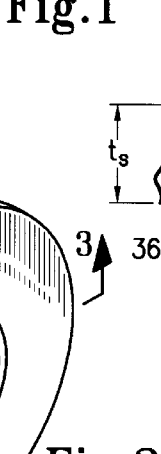
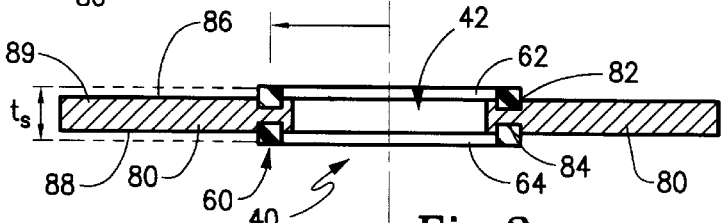

INCREASED PRESSURE FLUID CARRYING PIPELINE SYSTEM AND METHOD THEREFOR

FIELD OF THE INVENTION

The present invention broadly relates to the method of sealing a flange joint in a fluid carrying pipeline system wherein the fluid carrying pipeline system includes a plurality of joined pieces that define a flow line. More specifically, however, the present invention concerns a method for maximizing the pressure capability of a selected flange joint and a fluid carrying pipeline system having increased pressure capabilities.

BACKGROUND OF THE INVENTION

Seal devices have been used in a variety of applications to prevent fluid from leaking between joined pieces. For example, a seal device is interposed and compressed between flanged end-connections of a flow line wherein in-line process control equipment is installed. In-line process control equipment includes valves, pumps, flow meters, temperature controllers, pressure controllers and the like. This equipment usually cannot be welded into the flow line because time-scheduled maintenance requires temporary removal of this equipment and, occasionally, depleted equipment must be removed for replacement. In-line process control equipment is used in a variety of industries such as the chemical industry for processing, transporting and dispensing a myriad of chemicals and chemical compounds as well as in the oil and gas industry for recovering, distributing and processing oil, gas and by-products thereof.

Different fluid carrying pipeline systems operate at different pressures. When the operating pressure is in excess of 1000 PSI, it is often referred to as a "high pressure system". As such, the pipeline system requires high pressure flanged joints. Naturally, flanges that form a flange joint and the gaskets and seals associated therewith must meet certain pressure rating specifications, depending upon the pressure of the pipeline system with which they are intended to operate.

Accordingly, various organizations have classified flanges, gaskets and seals to certain rated pressures. For example, the American Society of Mechanical Engineers "ASME" has specified certain rules for bolted flange connections. One such example is found in the ASME Boiler and Pressure Vessel Code, Section 8, Division 2, Appendix 3. ASME/ANSI B16.5 specifications set forth certain pressure classes for flanges and their rated working pressures, as exemplified in the following table:

TABLE I

| ASME/ANSI Pressure Class | ASME/ANSI B16.5 Rated Working Pressure |
|---|---|
| 300 | 750 PSI |
| 600 | 1440 PSI |
| 900 | 2250 PSI |
| 1500 | 3750 PSI |
| 2500 | 6250 PSI |

These working pressures are a result of the interplay of many variables included in the flange joint connection. In the design of a flange joint, two primary design conditions are typically considered. First, the conditions required to resist a hydrostatic end force tending to part the flange joint may be referred to as the "operating condition". Here, sufficient compression must be maintained on a gasket contact surface sufficient to assure a tight joint. The minimum load on the flange joint under operating conditions is a function of the design pressure, the gasket material and the effective gasket contact area to be kept tight under pressure. This formula may be expressed as follows:

$$W_{m1}=H+H_p=0.785G^2P+(2b\times3.14GmP) \quad (1)$$

where G=diameter at location of gasket load reaction

P=design pressure h=effective gasket contact surface seating width m=gasket factor The conditions existing when the gasket contact surfaces seated by applying an initial load with the flange bolts is referred as "$W_{m2}$", that is the minimum required bolt load for gasket seating. This factor is a function of the gasket material and effective gasket contact area to be seated. This relationship may be expressed as follows:

$$W_{m2}=3.14\ bGy \quad (2)$$

where b=effective gasket contact surface seating width

G=diameter at location of gasket load reaction y=gasket contact surface unit seating load In addition to the bolt loading considerations of Formulas 1 and 2, other stresses on the flange joint are also significant. Among these are longitudinal hub stress (tension), radial flange stress (hoop stress) and tangential flange stress. The moment of a load acting on the flange, of course, is a product of the load (force) and its moment arm. For operating conditions, the total flange moment "$M_o$" is the sum of three individual moments "$M_D$", "$M_T$" and "$M_G$". For gasket seating, the total flange moment "$M_o$" is based on flange design bolt load which is opposed by the gasket load.

In calculating flange stresses, it is important to determine such stresses for both operating conditions and gasket seating. For integral type flanges, these stresses are expressed as follows:

$$\text{Hub stress: } S_H=fM_o/Lg_1^2B \quad (3)$$

$$\text{Radial stress: } S_R=(1.33te+1)M_o/Lt^2B \quad (4)$$

$$\text{Tangential stress: } S_T=YM_o/t^2B-ZS_R \quad (5)$$

where f=hub stress correction factor

L=factor (te=1/T+t³/d)

$g_1$=thickness of hub at back of flange

B=inside diameter of flange t=flange thickness e=factor (F/h for integral flanges)

Y=factor involving K

Z=factor involving K

While it is not the purpose of this background to set forth a dissertation of flange design, such technology being known by the ordinarily skilled person in this field, it may be seen that the flange stress, in all instances, is linearly proportional to the flange moment "$M_o$". For gasket seating, the total flange moment "$M_o$" is based on the flange design bolt load, which is opposed only by the gasket load in which case:

$$W(C-G)/2 \quad (6)$$

where W=flange design bolt load

C=bolt circle diameter

G=diameter at location of gasket load reaction

For high pressure fluid carrying systems, it is heretofore been thought necessary to use gaskets which have a gasket factor "m" and a minimum design seating stress "y" that were relatively high. As is well-known, the system operating pressure equals "y/m". Accordingly, for example, a spiral wound stainless or monel, asbestos filled gasket material has a seating stress of approximately 10000 PSI with a gasket factor of 3.00. Accordingly, such a gasket can handle a system pressure up to approximately 3330 PSI when the minimum design seating stress is applied. In standard high pressure applications, it is typical to use a ring-type gasket having a seating stress value of 18000 to 26000 PSI with a gasket factor of 5.50 to 6.50. Accordingly, these systems can handle system pressures in the 3000 to 4000 PSI range when the minimum design seating stress is applied. Importantly, however, if such gasket materials are placed near the flange bore (annulus), the operating bolt load condition "$W_{m1}$" is minimized. However, such placement increases the flange moment "$M_o$" since such positioning is furthest away from the bolt holes of the flange. Similarly, placing the gasket nearer to the bolt holes, while reducing the flange moment and thus flange stresses, increases the operating bolt load stress "$W_{m1}$". Accordingly, in order to allow for greater bolt loads to seat such high pressure gaskets, flange design manufacturers are required to increase the flange dimensions and weight. This typically increases the cost of such flanges dramatically which can concomitantly increase the cost of high pressure flow line systems. Accordingly, there is a substantial and long-felt need for a method of sealing flange joints for high pressure systems without the need for costly flange joints in a manner that still meets ASME/ANSI B16.5 specifications with no ASME Boiler and Pressure Vessel Code deviations.

SUMMARY OF THE INVENTION

It is an object of the present invention to provide a new and useful method for sealing flange joints in a fluid carrying pipeline system.

Another object of the present invention is to provide a method of increasing the system operating pressure capability of a selected flange joint so that a lower pressure class flange can be used in a higher pressure fluid carrying pipeline system in a safe manner.

A further object of the present invention is to increase the pressure at which a flange joint may operate over that currently specified in ASME/ANSI B16.5 specifications with no ASME Boiler and Pressure Vessel Code deviations, preferably by a factor of at least 1.3.

Another object of the present invention is to provide a method for maximizing the system operating pressure capability of a selected flange joint so that a lower pressure class flange may be used in a higher pressure system thus reducing the expense of such a system.

Yet another object of the present invention is to provide a method of sealing a flange joint that will work with a standard "off-the-shelf" RTJ or raised face flanges for pressure applications above 1000 PSI.

Still a further object of the present invention is to provide a high pressure flow line system using lower pressure class flanges.

According to the present invention, then, a method of increasing the system operating pressure capability of a selected flange joint in a fluid carrying pipeline system is described. Such a fluid carrying system has joined flow line sections that are connected together at flange joints with a flange joint having a pair of facing flanges adapted to be connected together by a plurality of bolts. These bolts extend through aligned holes that are formed through the flanges around a peripheral margin and in spaced relation to the axial bore that conveys a longitudinal flow of fluid therethrough. The flanges have a pair of facing flange surfaces adapted to receive a seal therebetween with the facing flange surfaces having an outer flange surface margin.

According to the present invention, the method of increasing the system operating pressure capability includes a first step of minimizing bolt load operating conditions and bolt load pre-load conditions at the flange joint by interposing a self-energizing seal assembly in surrounding relation to the axial bore of the flanges. This seal assembly is interposed at an inner radial location proximate to the axial bore with the self-energizing seal assembly having a seal thickness. The self-energizing seal assembly has negligible "m" and "y" values and is positioned to contact both respective flange surfaces. Next, the method includes the step of minimizing the load producing moment resulting from connection of the flanges with the bolts by interposing a gasket element in surrounding relation to the seal assembly and an outer radial location that is proximate to the outer flange surface margin. Here, the gasket element has a gasket thickness that is less than the seal thickness. Finally, the flanges are connected with the bolts to form the flange joint and, by connecting the flanges, the self-energizing seal assembly and the gasket element are supported at the inner and outer radial locations with the self-energizing seal assembly being compressed from the seal thickness to the gasket thickness.

The method preferably includes the step of supporting the self-energizing seal assembly by encapsulating the seal assembly between a retainer assembly and the flange surfaces of the respective flange joint. Here, the retainer assembly includes the gasket and, more preferably, the gasket, itself, forms the retainer. The gasket element can extend radially from the axial bore to the outer radial location so that it has opposite first and second gasket surfaces that are operative to confront the flange surfaces. The retainer assembly is then formed by a continuous first groove formed in the first gasket surface and a continuous second groove formed in the second gasket surface with the second groove being oppositely disposed with respect to the first groove. The self-energizing seal assembly then includes first and second self-energizing seal elements respectively received in the first and second grooves. Moreover, the first and second seal elements are pre-mounted in the first and second grooves prior to positioning the gasket element between the flanges. Here, also, the first and second seal elements may be selected from a group consisting of: O-rings, metallic seals, elastomeric seals and spring-activated seals.

Preferably, this method increases the system operating pressure capability by at least a factor of 1.3 so that a standard, "off-the-shelf" flange may be employed with higher system pressure. To this end, it is preferred that the "m" and "y" values of the self-energizing seal assembly be zero while the gasket element is constructed of a material having a "y" value of at least 5000 PSI. If desired, an outer annular seal element may surround each of the self-energizing seal elements in spaced relation from the radial location with these outer annular seal elements each being received in outer annular grooves respectively formed in the first and second gasket surfaces. This provides an auxiliary seal element for use with the seal system.

A method is also contemplated forming a high pressure fluid carrying pipeline system adapted to convey fluid at a system pressure of least 1000 PSI. Thus, the method of forming the high pressure fluid carrying pipeline system includes providing a plurality of flow line sections with flanges having a pressure rating of less than 1000 PSI, with these flanges being of the type described above. Bolt load operating conditions and bolt load pre-load conditions at the flange joints are minimized, as described above, by interposing a self-energizing seal assembly proximate to the axial bore of the flanges. The load producing moment is minimized by placing a rigid gasket element in surrounding relation to the seal assembly at an outer radial location that is proximate to the outer flange surface margin. The flow line sections are then connected together by joining respective pairs of the flanges.

The present invention also concerns a high pressure fluid carrying pipeline system. In its broad form, the system includes a plurality of joined pipeline sections which are adapted to convey a fluid in a longitudinal downstream direction. At least some of the sections are connected together at flange joints having a selected pressure rating with the flange joints including a pair of facing flanges having holes formed therein around a peripheral margin in spaced relation from an axial bore in the flanges. The flanges thus have a pair of facing flange surfaces with an outer flange surface margin associated with each flange surface. A seal device is interposed between the pair of flanges corresponding to a flange joint. This seal device includes a self-energizing seal assembly in surrounding relation to the axial bore at an inner radial location. The seal assembly has a seal thickness, and it is positioned to contact both respect flange surfaces. The self-energizing seal assembly further has negligible "m" and "y" values. A rigid gasket element is disposed in surrounding relationship to each seal assembly at an outer radial location. The gasket element has a gasket thickness that is less than the seal thickness. A plurality of nut and bolt sets extend through the aligned longitudinal holes in the facing flanges and are operative to interconnect the flanges with the seal assembly compressed therebetween from the seal thickness to the gasket thickness. A fluid is then disposed in the axial bore at a system pressure that is in excess of the pressure rating of the flange joints.

The high pressure fluid carrying pipeline system is preferred to employ standard "off-the-shelf" flanges having an ASME/ANSI pressure class of 300, 600, 900, 1500 or 2500 with the system pressure associated with each pressure class being, respectively, 1000 PSI, 2000 PSI, 3000 PSI, 5000 PSI and 10000 PSI.

These and other objects of the present invention will become more readily appreciated and understood from a consideration of the following detailed description of the exemplary embodiment when taken together with the accompanying drawings, in which:

BRIEF DESCRIPTION OF THE DRAWINGS

FIG. 1 is a cross-sectional view of a flange joint diagramming selected flange parameters;

FIG. 2 is a perspective view of a first exemplary embodiment of a protective seal device according to a first exemplary embodiment of the present invention;

FIG. 3 is a cross-sectional view taken about lines 3—3 of FIG. 2;

FIG. 8 is a cross-sectional view similar to FIGS. 5–7 showing a fourth exemplary embodiment of the present invention.

DETAILED DESCRIPTION OF THE EXEMPLARY EMBODIMENT(S)

Figure 4:
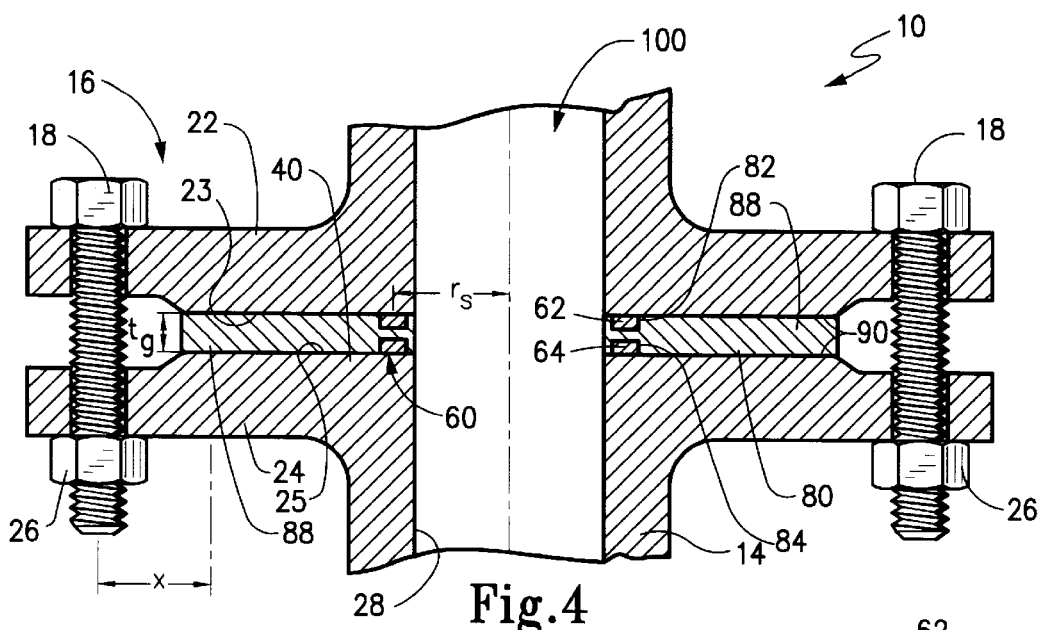
FIG. 4 is a cross-sectional view of a flange joint connection in a flow system according to the method of the first exemplary embodiment of the present invention.

The present invention concerns fluid carrying pipeline systems, especially those operative to convey longitudinal flow of fluid therethrough at an elevated system operating pressure. In such fluid carrying systems, a plurality of joined pieces are connected together, for example, at flange joints. Such fluid carrying systems are typically those used in the chemical industry for processing, transporting and dispensing chemicals as well as in the oil and gas industry for recovering, distributing and processing oil, gas and by-products thereof. Naturally, other types of high pressure fluid carrying pipeline systems, such as steam systems and the like, are contemplated by the present invention.

In any event, the present invention includes a system and method which, in essence, allows the upgrading of lower pressure class flanges so that they may be employed in higher pressure systems, especially those operating at least 1000 pounds per square inch (PSI). Accordingly, the present invention contemplates a method for maximizing the system operating pressure capability of a selected flange joint as well as a system which incorporates such method.

In order to appreciate the present invention, reference may first be made to FIG. 1 which shows representative components of a fluid carrying system 10 wherein two joined pieces in the form of a first pipe 12 and a second pipe 14 are connected together at a flange joint 16 by a plurality of bolts 18 that extend through aligned holes 20 that are formed through a pair of facing flanges 22 and 24. Bolts 18 are adapted to secure flange joint 16 together by fastening nuts 26. As may be seen, holes 20 are formed through flanges 22 and 24 around a peripheral margin of the flanges in spaced relation from axial bore 28 that is operative to convey a flow of fluid therethrough. Flange joint 16, and fluid carrying system 10, thus has a longitudinal axis "L", so it should be understood that the fluid flows in the longitudinal direction, typically at an elevated system operating pressure. Flanges 22 and 24 respectively have a pair of facing flange surfaces 23 and 25 which are adapted to receive a gasket or seal such as seal 30 therebetween.

As may be recalled from the background discussion, stresses on flange joint 16 are a function of numerous parameters. For purposes of this discussion, and with reference to FIG. 1, several dimensions are relevant. As is shown in this figure, seal 30 has a radius "$r_s$" so that, when it is interposed between flanges 22 and 24, it is located a distance "x" from the center of bolt holes 20. Thus, the location of the gasket load reaction "G" is this diameter, that is, "$2r_s$". From this it should appreciated that for a given design pressure and a given gasket or seal 30, the required bolt load for the operating conditions "$W_{m1}$" as well as the minimum initial bolt load "$W_{m2}$" are proportional to the diameter at the location of the gasket load reaction "G". Thus, as "$r_s$" increases, both "$W_{m1}$" and "$W_{m2}$" increase proportionally.

Moreover, with respect to the flange stresses, each are proportional to the flange moment "$M_o$". In FIG. 1, for longitudinal hub stress, "$M_o$" is proportional to the force applied by bolts 18 and nuts 26 which tend to compress seal 30 with the force moment operating at the distance "x"

between bolt holes 20 and seal 30. With this in mind, the flange moment "$M_o$" will decrease as "$r_s$" increases since the distance between axis "L" and the center of bolt holes 20 is always the sum of $x+r_s$. From the foregoing discussion, it may be appreciated that any decrease in flange stress is at a corresponding expense of an increase in the bolt load for operating conditions "$W_{m1}$" and the initial bolt load "$W_{m2}$". Conversely, where one seeks to decrease the bolt loads, flange stress increases because of the increase of the moment arm in traditional high pressure fluid carrying systems. The present invention, however, seeks to provide a method and a system that does not require such trade-off.

As is shown in FIGS. 2–5, a first exemplary embodiment of the present invention employs a gasket or seal device 40 which includes a self-energizing seal assembly 60 and a gasket element 80. As is shown in FIGS. 2 and 3, gasket element 80 is in the form of an annular retainer that may be constructed of metal, composites, glass reinforced epoxy or a laminated configuration of both. Importantly, the material used to construct gasket element 80 should be relatively rigid and have a seating stress factor "y" of at least 5000 PSI.

Seal assembly 60 includes a pair of seal elements 62 and 64 which are respectively received in grooves 82 and 84 respectively formed in gasket faces 86 and 88 of gasket element 80. In the exemplary embodiment shown in FIGS. 2–5, seal elements 62 are continuous annular rings such that grooves 82 and 84 are likewise annular in shape. Seal elements 62 and 64 are a self-energizing type of gasket or seal material such as polymeric O-ring, elastomer, metallic or other gasket type considered as self-sealing in the art of flange connections. An example of a preferred seal is a polytetrafluorethylene spring-energized ring. Importantly, such self-energizing types of gasket materials have both a gasket factor "m" and a seating stress "y" that are negligible and preferably 0. In FIG. 5, it may be seen that seal element 62 and 64 are U-shaped in cross-section having a spring element 83 and 85 respectively received therein.

Figure 5:
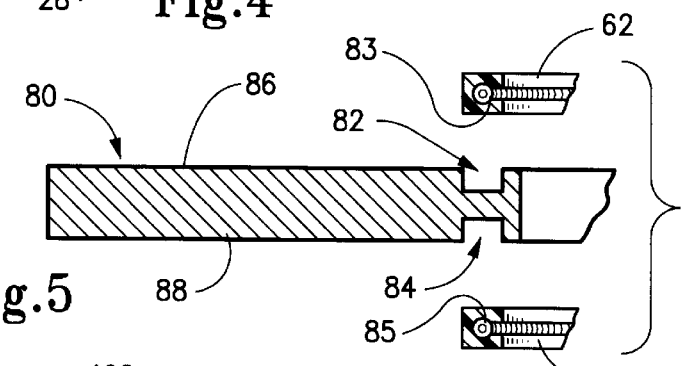
FIG. 5 is an enlarged, exploded cross-sectional view of a portion of the seal device shown in FIGS. 2–4.

With reference to FIG. 4, the method according to the present invention may now be more fully appreciated. In this figure, seal device 40 is shown in a compressed state being received between flanges 22 and 24 of flange joint 16 of fluid carrying system 10 that convey a fluid 100, such as a high pressure of at least 1000 PSI. Seal assembly 60 has a longitudinal seal thickness "$t_s$" (FIG. 3) in an uncompressed state but, as is shown in FIG. 4, may be compressed to the gasket thickness "$t_g$" corresponding to the thickness of gasket 80. Now, however, "$r_s$", that is the radial dimension of seal system 60, is at a minimum since seal assembly 60 is placed in surrounding relation to axial bore 28 at an inner radial location proximate to axial bore 28. Since each of seal elements 62 and 64 are self-energizing seal elements, preferably with "m" and "y" factors that are zero, the required bolt load for the operating condition, "$W_{m1}$", becomes simply $0.785\ G_2P$. Moreover, since "$r_s$" has been minimized, "G" is minimized so that "$W_{m1}$" is minimized. Further, "$W_{m2}$", the minimum initial bolt load is 0 since the seating stress "y" is 0.

However, contrary to the technique of the prior art, the flange moment "$M_o$" is not increased but, itself, is minimized. As is shown in FIG. 4, gasket element 80 includes its outer peripheral margin portion 88 that is proximate to outer flange surface margin 90. Thus, the moment arm "x" is also minimized.

When the above-described seal device 40 is employed according to this method, a substantial increase in the system pressure for a rated flange takes place. For example, for those same pressure class flanges described in Table I, above, the following results:

TABLE II

| ASME/ANSI Pressure Class | New Method Rated Working Pressure |
|---|---|
| 300 | 1000 PSI |
| 600 | 2000 PSI |
| 900 | 3000 PSI |
| 1500 | 5000 PSI |
| 2500 | 10000 PSI |

Thus, comparing this data to the data of Table I, it may be appreciated that the method described herein increases, that is, maximizes, the operating pressure of a rated class flange a factor of about 1.3 to 1.6. This allows for a lower rated flange to be employed in a higher pressure system without code violations. Naturally, this can result in substantial economic savings, especially since it allows the use of standard, less-expensive "off-the-shelf" flanges that do not require modification.

From the foregoing, it should now be appreciated that the method according to the present invention concerns maximizing the system operating pressure capability at a selected flange joint by a step of minimizing the bolt load operating condition and the bolt load pre-load condition at the flange joint by interposing a self-energizing seal assembly in surrounding relation to the axial bore of the seal assembly at an inner radial location proximately to the axial bore of the flange joint. This step includes the use of a self-energizing seal assembly having negligible "m" and "y" values and a seal thickness in a longitudinal direction. The next step according to the broad method is the minimizing of the load producing moment resulting from connection of the flanges of the flange joint by interposing a gasket element in surrounding relation to the seal assembly at an outer radial location that is proximate to the outer flange surface margin with this gasket element having a gasket thickness that is less than the seal thickness. Finally, the broad method includes the step of connecting the flanges with the bolts to form a flange joint and supporting the self-energizing seal assembly and the gasket element at the inner and outer radial locations with the self-energizing seal assembly being compressed from the seal thickness to the gasket thickness. Addition methodology steps utilize the structure described above and shown in these figures.

Figure 6:
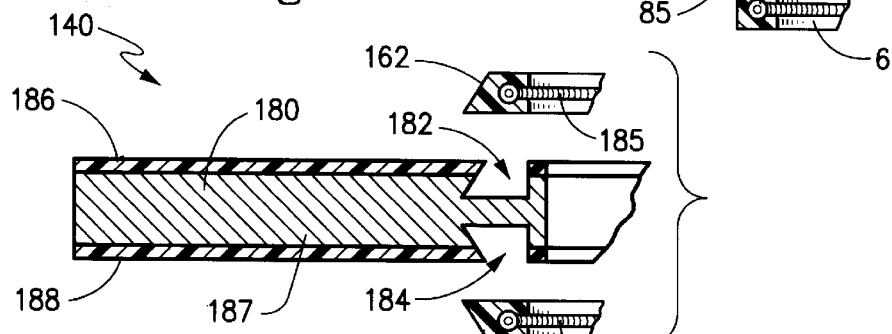
FIG. 6 is an exploded cross-sectional view, similar to FIG. 5, showing a second exemplary embodiment of the present invention.

Alternative seal devices can be employed with the present invention without departing from the scope thereof. For example, in FIG. 6, seal device 140 is shown to have a gasket body 180 that defines a retainer for seal elements 162 and 164. Here, gasket element 180 is formed of any suitable metallic material onto which is laminated any suitable non-metallic material as layers 186 and 188. Annular grooves 182 and 184 are trapezoidal in cross-section and are formed in opposed relation to extend through each of laminate layers 186 and 188 into central core 187. Grooves 182 and 184 receive annular seal elements 162 and 164 which are also trapezoidal in shape and which include energizing springs 185.

Figure 7:
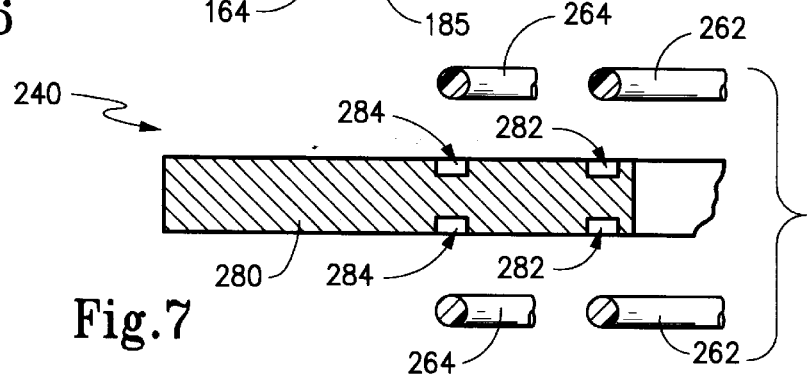
FIG. 7 is an exploded cross-sectional view, similar to FIGS. 5 and 6, showing a third alternative embodiment of the present invention.

In FIG. 7, a third alternative embodiment of seal device 240 is shown. Here, gasket element 280 has a pair of inner annular grooves 282. A pair of outer annular seal elements 264 are respectively received in oppositely disposed outer annular grooves 284 formed in gasket element 280. Here, each of seal elements 262 and 264 are polymeric O-rings.

A fourth exemplary embodiment of the present invention is shown in FIG. 8. Here, seal device 340 has a gasket body or retainer 380 which has a radially inwardly facing groove 382 formed on an edge 384 thereof. A single seal element 360 is disposed at inner edge 384 and includes a central section 362 received in groove 382 and a pair of oppositely extending wing-like sections 364 which define seal thickness "$t_s$". Retainer gasket 380 has a smaller thickness "$t_g$" as is shown in this figure. In this embodiment, it should be understood that edge 384 of retainer gasket 380 has a larger radius than the axial bore of the flanges with which is to be used with the added radius being equal to the radial thickness of seal 360. Thus, oppositely disposed sections 364 will compress between the flange surfaces at an innermost radial location at the axial bore of the flanges.

From the foregoing description, it should be appreciated that the present invention also includes a high pressure fluid carrying pipeline system employing the method described above. Here, a plurality of joined pipeline sections, as represented by first pipe 12 and second 14 are operative to convey a fluid in a longitudinal downstream direction. At least some of the joined sections are connected at flange joints, such as flange joint 16 which have a selected pressure rating. The flange joints, are described as above, and a seal device is interposed between the flanges corresponding to a flange joint.

The seal device according to the high pressure fluid carrying pipeline system may be of any of the type described above with respect to the exemplary embodiments. In any event, the seal assembly should have negligible "m" and "y" values, with these values preferably being zero. A rigid gasket element is disposed in surrounding relationship to each of the seal assemblies at an outer radial location. This gasket element is as described above with respect to gasket elements 80, 180, 280, and 380. Here, also, it is preferred that the gasket element define a retainer element for positioning the seal assemblies.

The high pressure fluid carrying pipeline system further comprises a plurality of nut and bolt sets or other connectors that are operative to secure the flanges together to form a respective flange joint. For sake of illustration, these connectors may be nut and bolt sets 18, 26 extending through longitudinally aligned holes in the facing flanges. The nut and bolt set interconnect the flanges so that the seal assembly is compressed therebetween from the seal thickness to the gasket thickness. Here, the gasket is sufficiently rigid so that it minimizes the bolt load moments at a location proximate to the outer margin of the flanges. A fluid is disposed, then, in the axial bore at a system pressure in excess of the selected pressure rating of the flange joints.

It should be understood that the high pressure fluid carrying pipeline system according to this invention, then, utilizes the above described method and may include any of the elements disclosed with respect to FIGS. 1–8. Accordingly, a detailed explanation of each of those elements is not repeated since the same are fully described in the foregoing description of the method.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. A method of maximizing a system operating pressure capability at a selected flange joint in a fluid carrying pipeline system that has joined flow line sections that are connected together at flange joints with the selected flange joint having a pair of facing flanges adapted to be connected together by a plurality of bolts extending through aligned holes that are formed therethrough around a peripheral margin or said flanges in spaced relation to an axial bore that is operative to convey a longitudinal flow of fluid therethrough at a system operating pressure with said flanges having a pair of facing flange surfaces adapted to receive a seal therebetween with said facing flange surfaces having an outer flange surface margin, said method comprising the steps of:

(a) minimizing bolt load operating conditions and bolt load pre-load conditions at the selected flange joint by interposing a self-energizing assembly that has negligible "m" and "y" values in surrounding relation to the axial bore of the selected flange joint at an inner radial location proximate to the axial bore, said self-energizing seal assembly having a seal thickness, and positioning the seal assembly so as to be in contact with both respective flange surfaces;

(b) minimizing the load producing moment resulting from connection of said flanges with said bolts by interposing a gasket element that has a gasket thickness that is less than the seal thickness in surrounding relation to said seal assembly at an outer radial location that is proximate to the outer flange surface margin; and (c) connecting said flanges with said bolts to from said flange joint while supporting said self-energizing seal assembly and said gasket element at the inner and outer radial locations respectively, said step of connecting said flanges being operative to compress said self-energizing seal from the seal thickness to the gasket thickness.

2. The method according to claim 1 wherein the step of supporting said self-energizing seal assembly includes encapsulating said self-energizing seal assembly between a retainer assembly and the flange surfaces.

3. The method according to claim 2 wherein said retainer assembly includes said gasket.

4. The method according to claim 2 wherein said gasket element extends radially from the axial bore to the outer radial location and has opposite first and second gasket surfaces operative to confront said flange surfaces, said retainer assembly being formed by a continuous first groove formed in the first gasket surface and a continuous second groove formed in the second gasket surface and oppositely disposed with respect to the first groove the step of supporting, said self-energizing seal assembly including first and second self-energizing seal elements respectively received in the first and second grooves.

5. The method according to claim 4 wherein said first and second seal elements are pre-mounted in the first and second grooves in said gasket element before said gasket element is positioned between said flanges.

6. The method according to claim 4 wherein said first and second seal elements are selected from a group consisting of: O-rings, metallic seals, elastomeric seals and spring-activated seals.

7. The method according to claim 4 wherein said seal system includes an outer annular seal element surrounding each of said self-energizing seal elements in spaced relation from the radial location, said outer annular seal elements each being received in an outer annular groove respectively formed in said first and second gasket surfaces.

8. The method according to claim 1 wherein said gasket element is constructed of a material having a "y" value of at least 5000 PSI.

9. The method according to claim 1 wherein the system operating pressure is increased by at least a factor of 1.3.

10. A method of forming a high pressure fluid carrying pipeline system adapted to convey a fluid at a system pressure of at least of 1000 PSI comprising the steps of:

(a) providing a plurality of flow line sections with flanges having a pressure rating of less than 1000 PSI wherein said flange joints each have a pair of facing flanges adapted to be connected together by a plurality of bolts extending through aligned holes that are formed therethrough around a peripheral margin of said flanges in spaced relation from an axial bore operative to convey a longitudinal flow of fluid therethrough with said flanges having a pair of facing flange surfaces adapted to receive a seal therebetween with said facing flange surfaces having an outer flange surface margin;

(b) minimizing bolt load operating conditions and bolt load pre-load conditions at the flange joint by interposing a self-energizing seal assembly in surrounding relation to the axial bore thereof at an inner radial location proximate to the axial bore, said self-energizing seal assembly having a seal thickness and positioned to contact both respective flange surfaces, said self-energizing seal assembly having negligible "m" and "y" values;

(c) minimizing the load producing moment resulting from connection of said flanges with said bolts by interposing a gasket element in surrounding relation to said seal assembly at an outer radial location that is proximate to the outer flange surface margin, said gasket element having a gasket thickness that is less than said seal thickness; and (d) connecting said flow line sections by joining respective pairs of said flanges with said bolts to form said flange joint and supporting said self-energizing seal assembly and said gasket element at the inner and outer radial locations with said self-energizing seal assembly being compressed from the seal thickness to the gasket thickness and thereby increasing the pressure rating of said flange joints to a level of at least 1000 PSI.

11. The method according to claim 10 wherein the step of supporting said self-energizing seal assembly includes encapsulating said self-energizing seal assembly between a retainer assembly and the flange surfaces.

12. The method according to claim 11 wherein said retainer assembly includes said gasket.

13. The method according to claim 11 wherein said gasket element extends radially from the axial bore to the outer radial location and has opposite first and second gasket surfaces operative to confront said flange surfaces, said retainer assembly being formed by a continuous first groove formed in the first gasket surface and a continuous second groove formed in the second gasket surface and oppositely disposed with respect to the first groove, said self-energizing seal assembly including first and second self-energizing seal elements respectively received in the first and second grooves.

14. The method according to claim 13 wherein said first and second seal elements are pre-mounted in the first and second grooves in said gasket element before said gasket element is positioned between said flanges.

15. The method according to claim 10 wherein the system operating pressure is increased by at least a factor of 1.3.

16. The method according to claim 10 wherein said flanges are selected from a group consisting of raised face flanges and RTJ flanges.

17. A high pressure fluid carrying pipeline system, comprising:

(a) a plurality of joined pipeline sections adapted to convey a fluid in a longitudinal downstream direction, at least some of said joined pieces being connected together at flange joints having a selected pressure rating, such flange joints including a pair of facing flanges having holes formed longitudinally therethrough around a peripheral margin thereof in spaced relation from an axial bore in said flanges, said flanges having a pair of facing flange surfaces with an outer flange surface margin associated with each flange surface;

(b) a seal device interposed between said pair of flanges corresponding to a flange joint, said seal device including a self-energizing seal assembly in surrounding relation to the axial bore at an inner radial location, said self-energizing seal assembly having a seal thickness and positioned to contact both respective flange surfaces, said self-energizing seal assembly having negligible "m" and "y" values;

(c) a rigid gasket element in surrounding relation to each said seal assembly at an outer radial location, said gasket element having a gasket thickness that is less than said seal thickness;

(d) a plurality of nut and bolt sets having bolts extending through the aligned holes, said nut and bolt sets interconnecting said flanges with said seal assembly compressed therebetween from the seal thickness to the gasket thickness; and (e) a fluid disposed in the axial bore, said fluid at a system pressure in excess of the selected pressure rating of said flange joints.

18. A high pressure fluid carrying pipeline system according to claim 17 wherein the said flanges are selected to have an ASME/ANSI pressure class selected from the following table with said system pressure at least at a respective magnitude of: ASME/ANSI

| ASME/ANSI Pressure Class | System Pressure (PSI) |
|---|---|
| 300 | 1000 PSI |
| 600 | 2000 PSI |
| 900 | 3000 PSI |
| 1500 | 5000 PSI |
| 2500 | 10000 PSI |

19. A high pressure fluid carrying pipeline system according to claim 17 including a retainer assembly associated with each said seal assembly, each said retainer element including a respective said gasket element.

20. A high pressure fluid carrying pipeline system according to claim 19 wherein said gasket element extends radially from the axial bore to the outer radial location and has opposite first and second gasket surfaces operative to confront said flange surfaces, said retainer assembly being formed by a continuous first groove formed in the first gasket surface and a continuous second groove formed in the second gasket surface and oppositely disposed with respect to the first groove, said self-energizing seal assembly including first and second self-energizing seal elements respectively received in the first and second grooves.

21. A high pressure fluid carrying pipeline system according to claim 19 wherein said first and second seal elements are selected from a group consisting of: O-rings, metallic seals, elastomeric seals and spring-activated seals.

22. A high pressure fluid carrying pipeline system according to claim 19 wherein said seal system includes an outer annular seal element surrounding each of said self-energizing seal elements in spaced relation from the radial location, said outer annular seal elements each being received in an outer annular groove respectively formed in said first and second gasket surfaces.

* * * * *